United States Patent
Takimoto et al.

[11] Patent Number: 5,804,315
[45] Date of Patent: Sep. 8, 1998

[54] WELD-OBSCURING THERMOPLASTIC RESIN COMPOSITION AND A MOLDED ARTICLE

[75] Inventors: Masahiro Takimoto, Inabe-gun; Mayumi Maeda, Niwa-gun; Masato Kobayashi, Suita; Ikutaro Iizuka, Tokyo; Mitsuhiro Isomichi, Takatsuki, all of Japan

[73] Assignee: Toyoda Gosei Co., Ltd., Aichi-ken, Japan

[21] Appl. No.: 609,380

[22] Filed: Mar. 1, 1996

[51] Int. Cl.$^6$ ............................ B32B 9/00; C08K 3/08; C08J 3/02
[52] U.S. Cl. .................. 428/402; 428/357; 428/363; 428/372; 524/439; 524/440; 524/441; 106/239
[58] Field of Search .................... 428/323, 357, 428/363, 372, 402; 524/439, 440, 441; 106/239

[56] References Cited

FOREIGN PATENT DOCUMENTS 58-37045  3/1983  Japan .
61-49817  3/1986  Japan .

*Primary Examiner*—Richard Weisberger
*Attorney, Agent, or Firm*—Cushman Darby & Cushman, IP Group of Pillsbury Madison & Sutro LLP

[57] ABSTRACT

Provided is weld-obscuring, thermoplastic resin composition which when suitably molded substantially obscures the appearance of weld lines. The resin composition is made of a thermoplastic resin, about 0.01 to about 15.0 wt. % of a weld-obscuring agent having a refractive index greater than the refractive index of the thermoplastic resin in the visible light range, and about 0.1 to about 8 wt. % of glitter material having an average particle size in the range of about 5 to about 120 μm. X is between $(10.6-(Y/11.4 \mu m))$ wt. % and about 0.1 wt. % when $Y \geq 30$ μm, and when Y is <30 μm, X is between about 0.1 wt. % and about 8 wt. %, wherein X is the amount of glitter material added and Y is the average particle size of the glitter material. Also provided is a molded article made of the resin composition.

19 Claims, 7 Drawing Sheets

ENLARGED SCALE: |← 300 μm →| |← 30 μm →|
HORIZONTAL        VERTICAL
DIRECTION         DIRECTION

ENLARGED SCALE: |← 300 μm →|  |← 30 μm →|
HORIZONTAL       VERTICAL
DIRECTION        DIRECTION

| ITEM | RANK | | |
|---|---|---|---|
| | EXCELLENT | SO SO | ABSOLUTELY NOT |
| SMOOTH | ⊢―┼―――┼―――┼―――┤ | | |
| GLITTER | ⊢―┼―――┼―――┼―――┤ | | |
| DENSE | ⊢―┼―――┼―――┼―――┤ | | |
| CLEAR | ⊢―┼―――┼―――┼―――┤ | | |
| HIGHLY GRADED | ⊢―┼―――┼―――┼―――┤ | | |
| VIVID | ⊢―┼―――┼―――┼―――┤ | | |
| GLOSS | ⊢―┼―――┼―――┼―――┤ | | |
| DEEP | ⊢―┼―――┼―――┼―――┤ | | |

WELD-OBSCURING THERMOPLASTIC RESIN COMPOSITION AND A MOLDED ARTICLE

BACKGROUND OF THE INVENTION

1. Field of the Invention

The present invention relates to a weld-obscuring, resin composition for molding an article such as exterior parts on an automobile, enclosures of office automated equipment or audio visual equipment, containers, ornamental articles or the like, which obscures the appearance of weld lines on the molded article surface.

2. Description of the Related Arts

Coating compositions have been applied to welds on a molded resin article formed from a thermoplastic resin to attempt to smooth the appearance of the exterior surface and to provide a deep metallic luster and pearl- or silk-like glitter. However, to provide a smooth surface and adequately cover the weld lines requires complicated processes including degreasing for cleaning, primer coating, in-process coating, top coating, dusting, drying, baking and so on. The above processes require undesirably costly facilities and materials as well long cycle times, resulting in unwanted and increased production costs.

It is known to produce a molded article having a metallic lustrous or pearl-like glitter surface by mixing a glitter material (mica or scaly aluminum powder) directly with the thermoplastic resin used for making the molded article. However, the impression of depth and the quality of the resultant molded articles are far inferior to those of coated articles. In the case of molding an article having a complicated configuration using this process, an undesirable exterior flaw, known as a weld line, will be unavoidably formed on its surface.

Japanese Patent Application Publication Laid-Open No. 37045/1983 discloses a resin composition prepared by adding 0.5 to 30 wt. % of metallic powder as a glitter material to a mixture of ABS resin and AS resin in an attempt to provide a molded product having a smooth metallic luster which is free of weld lines. However, this composition results in the formation of undesirable black weld lines on the article surface, which significantly degrades the external appearance of the molded article. Japanese Patent Application Publication Laid-Open No. 27932/1992 points out these undesirable shortcomings of the coating composition of JP 37045/1983.

Molded articles formed from known resin compositions typically cause roughness on the surface of the molded article ranging from about 10 to 100 pm when the resin is solidified within a metal mold. Such roughness is caused by the difference in shrinkage factors between the metallic powders and the resin. The rough surface deteriorates the impression of depth of the molded article. Formation of such roughness cannot be prevented by smoothing the inner surface of the metal mold. The aforementioned prior art, JPA No. 27932 discloses a method for restraining the formation of weld lines by adding 0.1 to 20.0 parts by volume of a metallic particle having a maximum outer size ranging from 10 $\mu$m to 1 mm to the thermoplastic resin. When the metallic particle is added, the adding process is controlled so that the average gap between metallic particles D and the weld width H is correlated as D$\geq$H.

The above technique allows the metallic particles to be uniformly dispersed. However, this technique still fails to cover the weld lines, the periphery of which are dark colored. If the molded product is brightly colored, the weld line will be easily observable as an obvious defect. The process of how the weld line is formed is described hereinafter.

As described in the above publications, in the course of molding, the outermost part of the molten resin flow in the metal mold becomes a layer containing no glitter material. At the site where each top of two molten resin flows confront each other (melt front), the layer containing no glitter material abruptly changes its direction from horizontal to vertical in relation to the article surface. Therefore, at the melt surface, the layer containing no glitter material flows deeply inside the article. Rays of light incident upon this site may not be reflected but absorbed by the glitter material, resulting in clear black weld lines on the molded article surface.

Conforming to the condition D>H indicates that a gap between particles of the glitter material has been broadened about twice or more times wider than the outermost layer containing no glitter material. This may cover up for the absence of the glitter material particles around the weld site. However, it cannot prevent the outermost layer containing no glitter material from being vertically directed into the molded article surface. As a result, dark colored lines (weld lines) are produced on the molded resin article surface.

As aforementioned, since the conventional injection molded articles exhibit inferior appearance due to poor color tone or weld lines, they cannot be used as they are and they must be coated.

There is a great need for a thermoplastic resin composition suitable for injection molding which provides the same color tone and quality, such as metallic luster, pearl- or silk-like glitter as those of coated products, yet requires no costly and complicated coating processes.

SUMMARY OF THE INVENTION

An objective of the present invention is to provide a thermoplastic resin composition which when molded exhibits excellent color tone such as metallic luster and silk- or pearl-like glitter and significantly obscures weld lines so they are not readily seen.

Surprisingly, a thermoplastic resin composition has been found that when molded any weld lines present in the molded article surface are significantly obscured, thus obviating the need for an expensive coating.

The present invention provides a weld-obscuring, thermoplastic resin composition which when molded substantially obscures the appearance of weld lines. The resin composition comprises:

a thermoplastic resin;

about 0.01 to about 15.0 wt. % of a weld-obscuring agent having a refractive index greater than the refractive index of said thermoplastic resin in the visible light range; and about 0.1 to about 8 wt. % of glitter material having an average particle size in the range of about 5 to about 120 $\mu$m, wherein X is between (10.6−(Y/11.4 $\mu$m)) wt. % and about 0.1 wt. % when Y$\geq$30 $\mu$m, and when Y is<30 $\mu$m, X is between about 0.1 wt. % and about 8 wt. %, where X is the amount of glitter material added and Y is the average particle size of the glitter material.

The invention also provides a molded article having obscured weld-lines comprising:

a thermoplastic resin;

about 0.01 to about 15.0 wt. % of a weld-obscuring agent having a refractive index greater than the refractive index of said thermoplastic resin in the visible light range; and about 0.1 to about 8 wt. % of glitter material having an average particle size in the range of about 5 to about 120 µm, wherein X is between (10.6−(Y/11.4 µm)) wt. % and about 0.1 wt. % when Y≧30 µm, and when Y is<30 µm, X is between about 0.1 wt. % and about 8 wt. %, where X is the amount of glitter material added and Y is the average particle size of the glitter material.

BRIEF DESCRIPTION OF THE DRAWINGS

FIG. 8 illustrates a quality criteria chart for evaluating the molded articles of Examples 2 to 9.

DETAILED DESCRIPTION OF THE INVENTION

Figure 1:
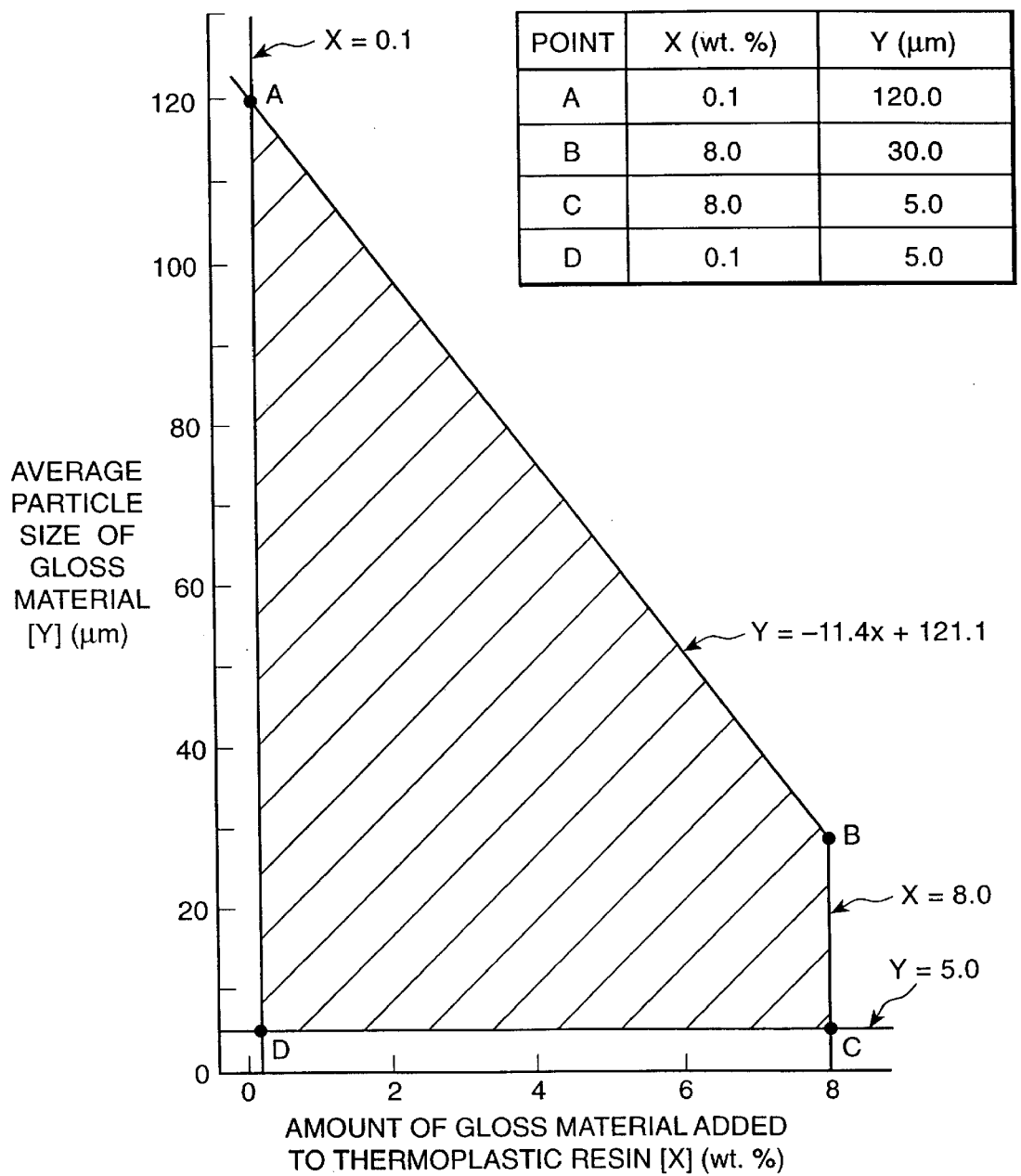
FIG. 1 illustrates a graphical representation of a range of the amount of a glitter material present in relation to the average particle size in Example 10, which obscures weld lines effectively.

The invention will be explained in greater detail and with reference to the attached figures.

In the present invention, about 0.01 to about 15.0 wt. % of a weld-obscuring agent can be added to a thermoplastic resin. The wt. % as used herein, unless otherwise stated, is based on the amount the thermoplastic resin in the composition. The weld-obscuring agent obscures the presence of weld lines by preventing light from being substantially absorbed by the weld lines by reflecting a substantial portion of the light hitting the weld lines. Thus, the weld-obscuring agent can be any material that is compatible with or can be combined with thermoplastic molding compositions, and which is capable of reflecting light away from the weld lines.

The weld-obscuring agent, for example, can be formed of colorless and transparent particles having a light refractive index higher than that of the thermoplastic resin, and preferably, about 1.8 or higher. If the light refractive index of the weld obscuring agent is lower than about 1.8, sufficient obscuring of the weld lines may not be developed.

Usually, the weld-obscuring agent itself is colorless and transparent. However, when the weld-obscuring agent is formed as particles, it may appear to be white because of a high refractive index.

Examples of suitable weld-obscuring agents include titanium oxide ($TiO_2$), lead oxide (PbO), zinc sulfide (ZnS) and antimony oxide ($Sb_2O_3$).

It is preferable that if the weld-obscuring agent is in the form of particles, the average particle size of the weld-obscuring agent be between about 0.01 µm to about 1 µm. When such a weld-obscuring agent is dispersed in the molten thermoplastic resin and cooled for solidifying, rays of light incident upon interface area between the weld-obscuring agent and the thermoplastic resin refracts and reflects at least in the visible wavelength band without significantly absorbing or damping any specific wavelength part. In this manner, a large part of the light rays are irradiated from the molded resin product surface instead of being absorbed.

The irradiation angle varies with individual particles for refraction and reflection at the interface area. As a result, the irradiated light is usually extremely scattered, presenting a substantially white color. If the particle sizes of the weld-obscuring agent are significantly smaller than those of glitter material, the weld-obscuring agent can be accommodated in the weld site to obscure the weld. A suitable particle size range of the weld-obscuring agent has been found to be about 0.01 to about 1 µm. If the particle size of the weld-obscuring agent is smaller than the wavelength of visible light, the incident light rays may not reflect. On the other hand, if the particle size is greater than about 1 µm, a sufficient amount of the weld-obscuring agent may not be accommodated into the outermost layer at that weld site. If a sufficient amount of the weld-obscuring agent is not accommodated into the outermost layer at the weld site, the weld site may not be sufficiently obscured by the weld-obscuring agent.

Adding the weld-obscuring agent can prevent the weld line from being dark colored and easily observable. Even if the molded product is bright colored, the weld line can be sufficiently obscured by the weld-obscuring agent. If about 0.01 wt. % or less of the weld-obscuring agent is added, the weld line may not be sufficiently obscured. If the amount exceeds about 15.0 wt. %, the resin layer may become unclear, deteriorating the glitter surface appearance developed by the glitter material.

The amount of the weld-obscuring agent varies with the type of the weld-obscuring agent used. For example, when using titanium dioxide, which exhibits a relatively high obscuring ability, it may be added to the thermoplastic resin closer to the low end of the range, which is about 0.1 wt. %. On the other hand, when using antimony oxide, which exhibits a relatively lower obscuring ability, it may be added, for example, in an amount of about 50 to 100 times more than the titanium dioxide.

If a colorant is present in the composition, the colorant may be a pigment or dye. The colorant can be used to provide a desired color by masking the white which can be produced by the weld-obscuring agent. For example, black pigment can be added in an amount to provide a black tone. The weld-obscuring agent still exists in the weld site even when the black pigment has been added. Therefore, rays of light reflect at the weld site, preventing the weld site from being colored darker than its periphery.

When obscuring the weld line, both the weld-obscuring agent and the pigment are preferably added in as small an amount as possible. Using unnecessarily excessive amounts of those materials can undesirably increase the production cost. Furthermore, when using a designated color having a high chroma, the color adjustment will become more complicated. For example, if the weld-obscuring agent has a high chroma it may function as a white pigment, and mixing a large amount of such a weld-obscuring may whiten the resulting article.

The colorant, if present, may be added after adding the weld-obscuring agent to the thermoplastic resin. Alternatively the weld-obscuring agent and the colorant may be mixed in advance, the mixture of which can be added to the thermoplastic resin to realize the desired color.

The glitter material can be any material which is conventionally used to provide a glittery sheen to molded articles. Glitter materials are well known in the art and one skill in the art reading and comprehending the present application will know how to use such glitter materials in the present weld-obscuring, thermoplastic resin composition. For example, the glitter material may be mica powder or scaly aluminum powder. The glitter material can also be formed by coating metals such as gold, silver, platinum or the like with flaked glass powder, tin powder, scaly brass powder, glass or mica powder using plating, deposition and spattering methods.

The average particle size of the glitter material and the amount added to the thermoplastic resin should be correlated to fall within the range as shown in FIG. 1. This range is represented by the following relationship:

X is between $(10.6-(Y/11.4 \mu m))$ wt. % and about 0.1 wt. % when $Y \geq 30 \mu m$, and when $Y < 30 \mu m$, X is between about 0.1 wt. % and about 8 wt. %, where X is the amount of glitter material added and Y is the average particle size of the glitter material.

Some of the exterior parts of an automobile such as a bumper, side molding, mud guard, wheel cap or the like are usually produced by coating a coating material containing glitter material on the molded resin product so as to provide a high quality color tone. If the particle size and amount of glitter material are not within the range shown in FIG. 1, the molded article formed by molding the present weld-obscuring, thermoplastic resin composition containing the glitter material and optional colorant (non-coated product) can result in a poor appearance even though it has been finished into the same color tone as that of the coated product according to the L, a and b scales established by CIE (Commission Internationale de l'Ealairage). Leaving the weld line out of consideration, the resultant uncoated product seems to lack depth in color, resulting in poor impression as a whole.

In order to clarify as to what physical difference influences how humans feel about the appearance of the mold article when observing and comparing structures of two types of products, optical measuring and sensory evaluation were conducted for analysis. As a result, it was concluded that the difference in surface smoothness was a major factor influencing the appearance of the molded article.

That is, the surface of the coated molded article exhibits a roughness, so called "orange peel", at a wavelength around 1 mm. At a lower wavelength around 1 $\mu$m, it exhibits a smooth surface without such roughness.

Figure 5:
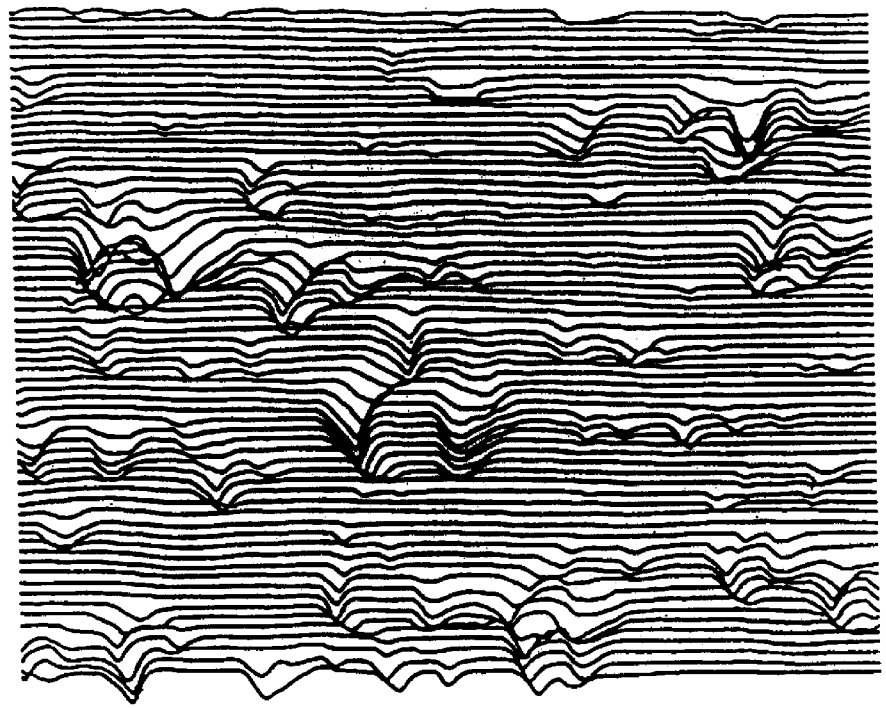
FIG. 5 illustrates a view three-dimensionally showing surface roughness of the molded article of Comparative Example 1.

While the surface of the non-coated molded article does not have a surface roughness identical to the orange peel, the surface has a large number of surface irregularities, each of which has a diameter of about 10 to about 100 $\mu$m. The periphery of the concave part of the surface irregularities are usually deeply depressed and the inside thereof is formed like a table as shown in FIG. 5. Such surface irregularities were found to have degraded the exterior appearance of the non-coated molded article.

Although surface irregularities ranging from 10 to 100 $\mu$m can be observed by a naked eye, exact configuration of each irregularity is too small to be observed. That is why the non-coated molded article surface gives a poor appearance as a whole.

The experimental evidence presented herein shows that the average particle size and amount of the glitter material added to the thermoplastic resin surprisingly has a significant effect on formation of surface irregularities on the non-coated molded article. If the condition for adding the glitter material to the thermoplastic resin is kept in the range defined by plotting coordinates A to D as shown in FIG. 1, a metallic luster and pearl- or silk-like glitter may be obtained as well as a deep and quality appearance on non-coated molded articles which is surprisingly equivalent to the appearance of the coated molded articles.

If the amount and particle size of the glitter material is outside of the range from the lines 1 and 2 disclosed in FIG. 1, the quality of the appearance may be significantly degraded. In the case of being outside of the lines 3 and 4 disclosed in FIG. 1, the quality color tone such as metallic luster which provided by the glitter material may not be obtained.

Any thermoplastic resin suitable for making molded articles may be used. The use of thermoplastic resins in molding articles is well known in the art and one skilled in the art knows how to select and use thermoplastic resins for molding articles having the desired properties. This invention is directed to improving the appearance of such thermoplastic molded articles. Specific examples of suitable thermoplastic resins include, but are not limited to, polystyrene, polypropylene, ABS, AS, polyamide, acrylic, PVC, PPO, and the like.

Known additives for their known function in thermoplastic resin compositions can be used. Specific examples of suitable additives include, but are not limited to, release agents, ultraviolet absorbing agents, and antioxidants.

The weld-obscuring, thermoplastic resin composition of the present invention can be used in the same manner as known thermoplastic compositions for their known uses in making molded articles. Specific examples of molded articles made using the present weld-obscuring, thermoplastic resin composition include, but are not limited to, plastic exterior parts for an automobile (bumper, side molding, wheel cap), enclosures of office automation equipment or multi-media terminals (personal computer, word processor, telephone, facsimile), AV equipment (VTR, TV, radio cassette recorder, audio amplifier, speaker box), and housings of electric appliances (refrigerator, laundry machine, vacuum cleaner, rice cooker, water heater and coffee maker).

The invention will be further explained by the following non-limiting examples.

EXAMPLES

Example 1

Figure 2:
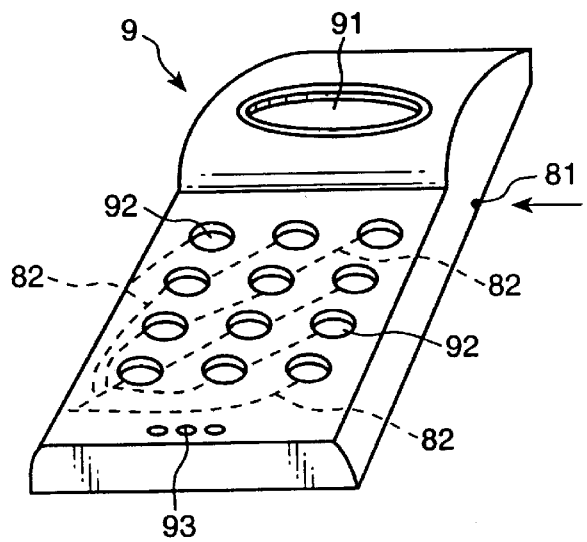
FIG. 2 illustrates a perspective view of a molded article which has been formed in Example 1.
Figure 3:
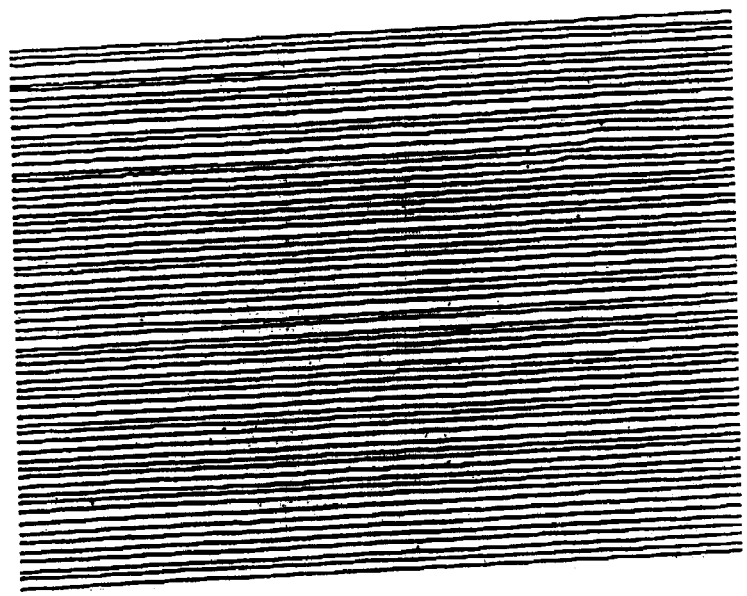
FIG. 3 illustrates a view three-dimensionally showing surface roughness of the molded article in Example 1.
Figure 4:
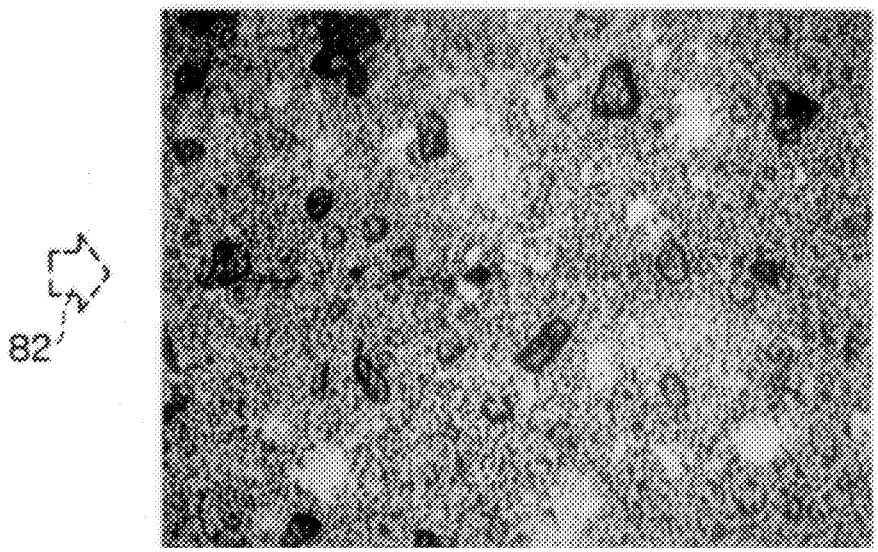
FIG. 4 illustrates a photomicrograph (×100) representing particle structure of the molded article in Example 1.

A weld-obscuring, thermoplastic resin composition according the present invention was prepared and injection molded. The exterior appearance of the resultant molded article was evaluated. FIGS. 2 to 4 show the evaluation results.

The polystyrene resin HI-G-1 (manufactured by Denki Kagaku) was used as the thermoplastic resin, which was mixed with 0.2 wt. % of rutile titanium dioxide ($\omega$: 2.616, $\epsilon$: 2.903) as the weld-obscuring agent in the tumbler mixer. The mixture was kneaded in the unidirectional bi-axial extruder (manufactured by Nakatani Kikai; screw diameter: 30 mm, L/D ratio of 28) under the following temperature conditions.

| Cylinder zone | temperature (C.°) |
|---|---|
| C1 (Feed side) | 150 |
| C2 | 200 |
| C3 | 215 |
| C4 | 226 |
| A (die side) | 225 |

The resulting resin material was subjected to color matching according to the color sample (No.447, "blue purple" in "Color Guide", 9th edition, published by Dainippon Ink Chemicals, Inc.). As a result, the colorant constituting cynian blue, quinacridone red and carbon black was added. As the glitter material, 1 wt. % of mascobyte mica having average particle size of 30 pm was added to the polystyrene resin. The resultant mixture was further kneaded in the uni-directional bi-axial extruder for forming a pellet from which the molded resin product of the present invention was formed.

The pellet was molded at 50 MPa in an injection molding machine (supplied by Kawaguchi Tekko Co.,type K125-1; clamping force: 125 tons, screw diameter: 42 mm) under the following temperature conditions, to produce a molded article as shown in FIG. 2. Results of the exterior appearance evaluations on this molded article are shown in FIGS. 3, 4 and Table 1.

| Cylinder zone | Temperature (°C.) |
| --- | --- |
| C1 (Feed side) | 190 |
| C2 | 200 |
| C3 | 230 |
| A (die side) | 220 |
| Nozzle | 220 |

In FIG. 2, a molded resin article 9 was formed as a receiver case of a phone unit. The molded resin article 9 was provided with a reception hole 91, 12 button holes 92 for the respective push buttons and a transmission hole 93. The molded resin article 9 had a gate 81 for a metal mold as indicated by an arrow.

Assuming that the molded resin article has been formed using a conventional process (comparative example described later), it had a weld line 82 on its surface. Each weld line 82 from the respective button holes 92 converges at a point in an opposite direction to the gate 81. While the molded resin article 9 of the present invention has substantially no visible weld lines 82 formed thereon.

FIG. 3 shows the test results of 3-D surface roughness test on the molded resin article 9. This test data shows a smooth surface without noticeable roughness both in vertical and horizontal direction was obtained, compared to the surface roughness of a comparative example not containing a weld-obscuring agent as shown in FIG. 5.

The surface roughness of the molded articles was measured as followed.

(Measurement condition)
Measurement device: Surfcom 554AD (manufactured by Tokyo Seimitsu)

| Probe | 0.01 mm |
| --- | --- |
| Scan speed | 0.30 mm/s |
| Draw pitch | 1.00 mm |
| Magnification (X-axis) | ×100 |
| Magnification (Y-axis) | ×100 |
| Magnification (Z-axis) | ×1,000 |

FIG. 4 is a photomicrograph (×100) showing the weld line formed on the surface of the molded resin article. This photo indicates that substantially no weld line 82 is easily visible thereon. Only a small trace of a weld line 82 transversely formed in the middle of the photo is dimly observed.

Comparative Example 1

Figure 6:
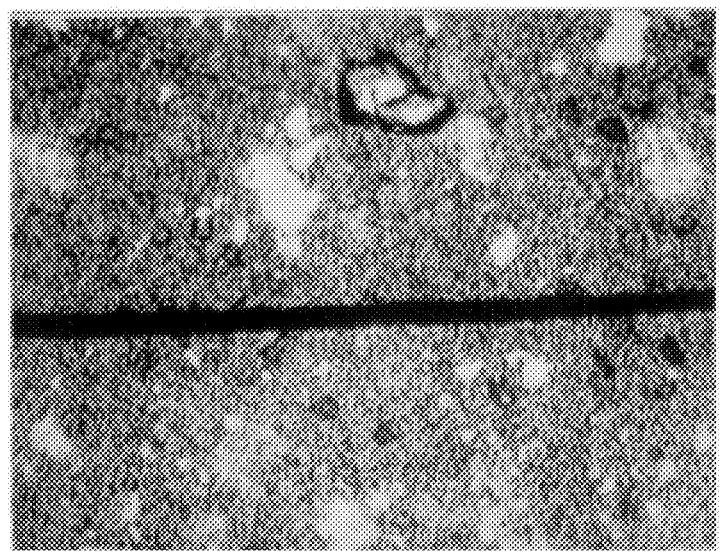
FIG. 6 illustrates a photomicrograph (×100) representing particle structure of the molded article in the Comparative Example 1.
Figure 6:

A conventional thermoplastic resin composition containing no weld-obscuring agent was prepared and injection molded to form a molded resin article. The resultant molded resin article was evaluated in a similar manner as Example 1. The evaluation results are shown in FIGS. 5 and 6.

In this Comparative Example 1, the polystyrene resin HI-G-l(manufactured by Denki Kagaku) was combined with colorant formed of cynian blue, quinacridone red and carbon black so that the product color is matched to the color No. 447 "blue purple" in "Color Guide" (9th edition) published by Dainippon Ink Chemical, Inc. Then 8 wt. % of the mascobyte mica as the glitter material having average particle size of 50 μm was added to the polystyrene resin. The mixture was formed into a pellet using kneading in the tumbler mixer and unidirectional bi-axial extruder under the same conditions as those of Example 1.

The pellet was molded into molded resin articles under the same conditions through the same metal mold and molding machine as that of Example 1. Results of exterior appearance evaluations of the molded resin articles are shown in FIGS. 5, 6 and Table 1.

FIG. 5 shows 3-D roughness on the surface of molded resin articles. The results in FIG. 5 shows a great degree of surface roughness in both the horizontal and vertical directions compared the surface roughness of Example 1 shown in FIG. 3.

FIG. 6 is a photomicrograph of the surface of the molded resin article. This photograph shows a clear weld line 82 (transversal bold black line in the middle of the photograph) present on the surface of the molded resin article formed from the thermoplastic resin composition used in the Comparative Example 1.

Table 1 shows results of exterior evaluation of the molded resin articles (Example 1 and Comparative Example 1) observed by a naked eye. In the evaluation, the molded resin articles were observed by a person having normal eye sight and color vision from a distance of 30 cm under light through a window to the north at 11 a.m. on a clear day.

As Table 1 shows, the molded resin molded article of Example 1 exhibited substantially no visible weld lines and exhibited metallic luster and a high quality color tone. On the contrary, the molded resin article of Comparative Example 1 exhibited easily visible weld lines, and exhibited a rough and poor appearance.

TABLE 1

Results of exterior evaluations on Example 1 and Comparative Example 1

| Item | Example 1 | Comparative Example 1 |
| --- | --- | --- |
| Weld line | Hardly observable. (When trying to find the weld line with care, it may be dimly observed) | Clearly observable as a thin black line |
| Quality | Glitter and transparent surface exhibited deep and high quality color tone | Exhibited a rough and poor appearance |

Examples 2–9, and Comparative Examples C2, C3, C11–C13:

As the above results show, the remarkable effect of the present weld-obscuring, thermoplastic resin composition for obscuring weld lines is readily observed and measured objectively.

However, evaluation of the quality of the glitter and color tone tends to be influenced by the individual evaluator's aesthetic sense.

Referring to Table 2, 8 kinds of non-coated products were produced by injection molding weld-obscuring, thermoplastic resin compositions according the present invention (Examples 2 to 9). Referring to Table 3, the thermoplastic resin compositions of comparative examples C2 and C3 were used to form non-coated products using injection molding similar to that used in Example 1. Coated products C11 to C13 were also prepared. The above-prepared test pieces were evaluated and analyzed by 9 persons based on quality criteria shown in FIG. 8.

Figure 7:
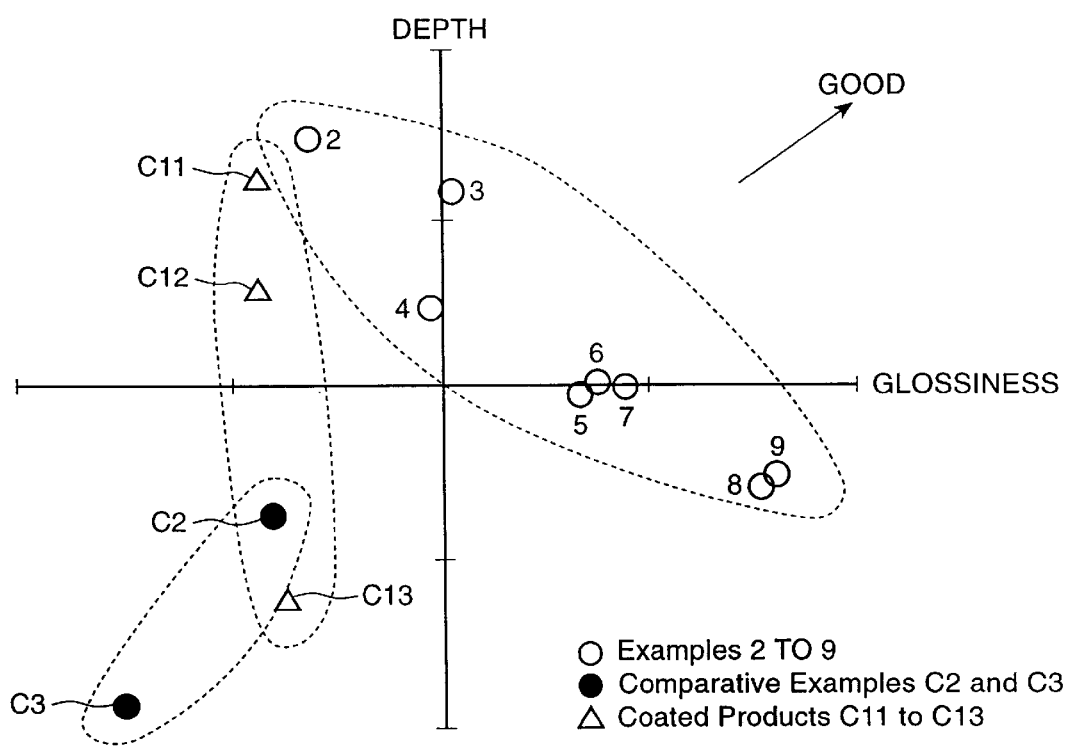
FIG. 7 illustrates a graphical representation showing results of quality evaluation on molded articles in Examples 2 to 9, and Comparative Examples C2, C3 and C11 to C13, respectively.

The results of the analysis are graphically shown in FIG. 7. Those 9 persons were selected among those who had been working in the field of the product color and design. It was made sure to prevent them from being informed of intentional or preconceived ideas other than quality evaluation so as to obtain fair results. For this, prior to the experiments, they had never been notified of information about the present invention such as the purpose for usage, material content, coloring process or the like. Furthermore it was made sure not to allow them to ask any questions which might lead them to the intended results favorable to the present invention.

Referring to FIG. 7, molded resin products formed of the weld-obscuring, thermoplastic resin compositions of Examples 2 to 9 resulted in excellent quality such as improved depth, glitter and highly graded impression.

The comparative Examples C2 and C3, which represent known thermoplastic resin compositions resulted in a rough and poor appearance compared with those of the present invention. The coated products C11 and C12 resulted in sufficient color depth, but they exhibited low glitter. The coated product C13 resulted in both low depth and glitter.

TABLE 3

Composition of Comparative Examples C2 and C3 and structures of coated products C11 to C13

| | | | Comparative Examples | | |
|---|---|---|---|---|---|
| Content | Test piece | | C2 | C3 | Coated Products |
| Thermoplastic resin | BCO3C: (polypropylene; Mitsubishi Kagaku) | | 100 | 100 | C11  2 layer * |
| Glitter material | Mascobyte mica Av. particle size: 100 μm | | | | |
| | Mascobyte mica Av. particle size: 60 μm | | | 8.0 | C12  Same as C11. |
| | Mascobyte mica Av. particle size: 20 μm | | 1.0 | | Orange peel observable. |
| | Scaly aluminum Av. particle size: 30 μm | | | | C13  1 layer ** |
| Weld obscuring agent | Titanium white (rutile) | | 0.2 | 0.2 | |

The amounts of glitter material and weld-obscuring agent are wt. % based on the amount of thermoplastic resin.
*: Reaction urethane color coated glitter material layer and transparent skin layer
**: Reaction urethane color coated glitter material layer The urethane coating was obtained by the reaction of acrylpolyol and isocyanate.

Example 10

The average particle size and amount of the glitter material added to the thermoplastic resin was varied to determine the effects thereof. The resultant thermoplastic resin compositions were processed into molded resin articles in the same manner as in Example 1.

The relationship between the average particle size and added amount of the glitter material is shown in FIG. 1 with respect to quality requirements such as color tone, depth and glitter of the surface of the molded resin articles.

In Example 10, 0.2 wt. % of titanium dioxide ($\omega$; 2.616, $\epsilon$; 2.903) as the weld-obscuring agent and 0.6 wt. % in total

TABLE 2

TABLE 2 Composition of Examples 2 to 9

| | | Examples | | | | | | | |
|---|---|---|---|---|---|---|---|---|---|
| Component | | 2 | 3 | 4 | 5 | 6 | 7 | 8 | 9 |
| Thermoplastic resin | BCO3C: (polypropylene; Mitsubishi Kagaku) | 100 | 100 | 100 | 100 | 100 | 100 | 100 | 100 |
| Glitter material | Mascobyte mica Av. particle size: 100 μm | 0.4 | | | | | | | |
| | Mascobyte mica Av. particle size: 60 μm | | 0.4 | | 4.0 | | | | |
| | Mascobyte mica Av. particle size: 20 μm | | | 0.4 | | 4.0 | 6.0 | | |
| | Scaly aluminum Av. particle size: 30 μm | | | | | | | 0.25 | 1.0 |
| Weld-obscuring agent | Titanium white (rutile) | 0.2 | 0.2 | 0.2 | 0.2 | 0.2 | 0.2 | 0.2 | 0.2 |

The amounts of glitter material and weld-obscuring agent are wt. % based on the amount of thermoplastic resin.
In order to match a color to the color sample (L*, a*, b*) = (13.17, −0.52, −15.02) in the color specification established by CIE (Commission Internationale de l'Eclairage), a colorant constituting carbon black, phthalocyanine blue and phthalocyanine green was added to all test pieces.

of phthalocyanine blue and phthalocyanine green (compound ratio=1:1) as the colorant were added to polypropylene resin, which was used as the thermoplastic resin. Each of varied measured amounts of the glitter material and having varied measured particle sizes were combined with the mixture to make a series of thermoplastic resin compositions. Mascobyte mica and scaly aluminum were used as the glitter material.

Then molded resin articles were formed from various kinds of thermoplastic resin compositions in a similar manner as that of Example 1. Each result of the quality evaluation was plotted on a graph similar to the one shown in FIG. 1 (not shown).

Alternatively 0.1 wt. % of zinc sulfide (light refractive index: 2.368) as the weld-obscuring agent and 0.35 wt. % of quinacridone red as the colorant were added to polypropylene resin, which was used as the thermoplastic resin. The resultant mixtures were likewise subjected to the evaluation.

The product formed by using the glitter material falling in the range defined by plotting coordinates A, B, C, and D was found to satisfy the quality requirements.

More specifically, molded articles made from the thermoplastic resin compositions in which the glitter material deviated from the lines 1 and 2 exhibited degraded quality. The molded articles made from the thermoplastic resin compositions in which the glitter material deviated from lines 3 and 4 exhibited degraded appearance such as insufficient metallic luster. Each coordinate of A to D is shown in FIG. 1 as well as the range defined thereby.

While the claimed invention has been described in detail and with reference to specific embodiments thereof, it will be apparent to one of ordinary skill in the art that various changes and modifications can be made therein without departing from the spirit and scope thereof.

What is claimed is:

1. A weld-obscuring, thermoplastic resin composition which when suitably molded substantially obscures the appearance of weld lines, the resin composition comprising:
   a thermoplastic resin;
   about 0.01 to about 15.0 wt. % of a weld-obscuring agent having a refractive index greater than the refractive index of said thermoplastic resin in the visible light range; and
   about 0.1 to about 8 wt. % of glitter material having an average particle size in the range of about 5 to about 120 $\mu$m, wherein X is between $(10.6-(Y/11.4\,\mu m))$ wt. % and about 0.1 wt. % when $Y \geq 30$ $\mu$m, and when Y is <30 $\mu$m, X is between about 0.1 wt. % and about 8 wt. %, where X is the amount of glitter material added in wt. % and Y is the average particle size of the glitter material in $\mu$m.

2. A weld-obscuring, thermoplastic resin composition according to claim 1, wherein said weld-obscuring agent has a refractive index of about 1.8 or higher.

3. A weld-obscuring, thermoplastic resin composition according to claim 1, wherein said weld-obscuring agent is at least one agent selected from a group consisting of titanium oxide, lead oxide, zinc sulfide and antimony oxide.

4. A weld-obscuring, thermoplastic resin composition according to claim 1, wherein said weld-obscuring agent is in the form of particles having an average particle size between about 0.01 $\mu$m to about 1 $\mu$m.

5. A weld-obscuring, thermoplastic resin composition according to claim 1, wherein said weld-obscuring agent is in the form of colorless and transparent particles.

6. A weld-obscuring, thermoplastic resin composition according to claim 1, wherein said glitter material is mica powder or scaly aluminum powder.

7. A weld-obscuring, thermoplastic resin composition according to claim 1, wherein said glitter material comprises a metal coated with at least one of flaked glass powder, tin powder, scaly brass powder, glass or mica powder.

8. A weld-obscuring, thermoplastic resin composition according to claim 7, wherein said metal comprises at least one of gold, silver, or platinum.

9. A weld-obscuring, thermoplastic resin composition according to claim 1, further comprising a colorant.

10. A weld-obscuring, thermoplastic resin composition according to claim 9, wherein said colorant is a pigment or a dye.

11. A molded article having obscured weld lines comprising:
    a thermoplastic resin;
    about 0.01 to about 15.0 wt. % of a weld-obscuring agent having a refractive index greater than the refractive index of said thermoplastic resin in the visible light range; and
    about 0.1 to about 8 wt. % of glitter material having an average particle size in the range of about 5 to about 120 $\mu$m, wherein X is between $(10.6-(Y/11.4\,\mu m))$ wt. % and about 0.1 wt. % when $Y \geq 30$ $\mu$m, and when Y is <30 $\mu$m, X is between about 0.1 wt. % and about 8 wt. %, where X is the amount of glitter material added in wt. % and Y is the average particle size of the glitter material in $\mu$m.

12. A molded article according to claim 11, wherein said molded article is an automobile part.

13. A molded article according to claim 11, wherein said weld-obscuring agent has a refractive index of about 1.8 or higher.

14. A molded article according to claim 11, wherein said weld-obscuring agent is at least one agent selected from a group consisting of titanium oxide, lead oxide, zinc sulfide and antimony oxide.

15. A molded article according to claim 11, wherein said weld-obscuring agent is in the form of particles having an average particle size between about 0.01 $\mu$m to about 1 $\mu$m.

16. A molded article according to claim 11, wherein said glitter material is mica powder or scaly aluminum powder.

17. A molded article according to claim 11, wherein said glitter material comprises a metal coated with at least one of flaked glass powder, tin powder, scaly brass powder, glass or mica powder.

18. A molded article according to claim 11, further comprising a colorant.

19. In a moldable thermoplastic resin composition comprising a thermoplastic resin, the improvement comprising:
    about 0.01 to about 15.0 wt. % of a weld-obscuring agent having a refractive index greater than the refractive index of said thermoplastic resin in the visible light range; and
    about 0.1 to about 8 wt. % of glitter material having an average particle size in the range of about 5 to about 120 $\mu$m, wherein X is between $(10.6-(Y/11.4\,\mu m))$ wt. % and about 0.1 wt. % when $Y \geq 30$ $\mu$m, and when Y is <30 $\mu$m, X is between about 0.1 wt. % and about 8 wt. %, where X is the amount of glitter material added in wt. % and Y is the average particle size of the glitter material in $\mu$m, wherein said resin composition when suitably molded substantially obscures the appearance of weld lines.

* * * * *